United States Patent Office 3,796,770
Patented Mar. 12, 1974

3,796,770
WATER-SOLUBLE COATING COMPOSITIONS
Wolfgang Daimer, Graz, Gerfried Klintschar, Weiz, and Heiner Verdino, Graz, Austria, assignors to Vianova-Kunstharz A.G., Vienna, Austria
No Drawing. Continuation-in-part of application Ser. No. 841,619, July 14, 1969, now Patent No. 3,658,795. This application July 8, 1971, Ser. No. 160,884
Claims priority, application Austria, July 22, 1970, A 6,667/70
The portion of the term of the patent subsequent to Apr. 25, 1989, has been disclaimed
Int. Cl. B01k 5/00; C08g 37/16
U.S. Cl. 260—839        11 Claims

ABSTRACT OF THE DISCLOSURE

Coating compositions characterized in that they are water-soluble upon neutralization comprising (A) a reaction product of a diene polymer and an alpha,beta-ethylenically unsaturated carboxylic acid and/or a dicarboxylic acid and/or an anhydride and/or a semi-ester and/or a semi-amide thereof, wherein up to about 70 percent of the carboxyl groups are reacted with a monohydric alcohol; and (B) a heat-reactive condensation product of formaldehyde with phenol carboxylic acids are described. The compositions, while being quick drying, have a low sensitivity to air oxidation.

---

This application is a continuation-in-part of co-pending application U.S. Ser. No. 841,619, filed July 14, 1969, now U.S. Pat. 3,658,795.

The present invention is directed to protective coatings and, more particularly, to coating compositions which are water soluble upon neutralization. These coatings comprise a blend of diene polymer-unsaturated carboxylic acid adduct and a heat reactive condensation product of formaldehyde and a phenol carboxylic acid, wherein up to about 70 percent of the carboxy groups of the diene polymer-unsaturated carboxylic acid adduct are esterified with a monohydric alcohol.

In the aforesaid parent application U.S. Ser. No. 841,619, filed July 14, 1969, coating compositions which are water soluble upon neutralization and which have low oxygen reactivity are described which comprise:

(A) a reaction product of a diene polymer with an alpha, beta-ethylenically unsaturated carboxylic acid and/or dicarboxylic acid and/or anhydride and/or semi-ester and/or semi-amide thereof which contains carboxyl groups; and
(B) a heat-reactive condensation product of formaldehyde with phenol-carboxylic acids.

Condensate B can be etherified and/or include a condensation product of formaldehyde and a phenol if desired. Moreover, the coating composition can optionally include:

(C) a polyhydroxy compound with at least two hydroxyl groups and a molecular weight of between 50 and 3,000; and
(D) condensation products of formaldehyde with ureas and/or aminotriazines which may or may not be etherified.

Component A provides rapid cure characteristics, whereas component B has the effect of stabilizing the coating compositions against oxidative influences and will cause an initial delay in the drying of the surface and, thus, improves flow and through hardening of the films. According to the process of the parent patent, the anhydride groups of the diene polymer-carboxylic acid adduct, after formation, are hydrolyzed with water.

It has now been found that, with a modification of the above process, coating compositions can be obtained which exhibit still lower oxygen reactivity and better uniformity of the properties of diluted aqueous solutions. According to the modification, component A after reaction of the diene polymer and alpha,beta-ethylenically unsaturated dicarboxylic acid and/or anhydride is further reacted with monohydric alcohols whereby a maximum of 70 percent of the carboxy groups present or latent, in the case of dicarboxylic acid anhydrides, are esterified. Thus, the present invention embraces coating compositions water soluble upon neutralization comprising:

(A) reaction products of diene polymers and alpha,beta-ethylenically unsaturated carboxylic acids and/or dicarboxylic acids and/or anhydrides thereof, and/or semi-esters which contain carboxy groups, which are esterified with monohydric alcohols in order that a maximum of 70 percent of the carboxy groups or latent carboxy groups are esterified; and
(B) a heat-reactive condensation product of formaldehyde with phenol-carboxylic acids.

Condensate B can be etherified and/or include a condensation product of formaldehyde and a phenol if desired. Moreover, the coating composition can optionally include:

(C) a polyhydroxy compound with at least two hydroxyl groups and a molecular weight of between 50 and 3,000; and
(D) condensation products of formaldehyde with ureas and/or aminotriazines which may or may not be etherified.

The components of the coating can, if desired, be chemically combined through careful condensation by heating at temperatures up to about 150° C. A chemical combination is particularly advisable if components B, C, or D have limited or no solubility in water.

The partial esterification of component A unexpectedly provides a simple means of reducing the auto-oxidative tendency of the compositions. This can be seen from a comparison of the behavior of component A on storage. Thus, the unesterified component A forms a thick skin after short access or exposure to air, which skin later becomes brittle and insoluble. On the other hand, the surface of the partially esterified component A, according to the present invention, remains soft and sticky, and unchanged. Similar results are observed when comparing paint films. Films of the unesterified component A rapidly develop a hard surface under which the coating vehicle remains soft and, thus, has bad adhesion to the substrate. Films of the esterified component A exhibit a markedly improved through drying and adhesion. By using the partially esterified component A in accordance with the present invention, contrary to the parent patent, it is possible to substantially reduce the component B, which, on the one hand, leads to an improvement in mechanical and anti-corrosive properties and which reduces the hazard of disproportioning of electrodeposition baths, on the other hand.

Suitable polymers of conjugated diolefins, called polymer oils hereinafter, are the polymers of conjugated dienes of the parent patent, e.g., polymers of butadiene-1,3, and/or 2-methyl-butadiene-1,3, and/or 2,3-di-methylbutadiene-1,3, and/or chloroprene, etc.; optionally with other co-polymerizable monomers such as styrene, alpha-methyl styrene, o-, m-, or p-chlorostyrene, vinyl naphthalene, vinyl cyclohexane, vinyl cyclohexene, vinyl acetate, (meth)acrylic esters, (meth)acryl nitrile, etc. These polymers have molecular weights of from about 200 to 20,000 and contain substantially isolated double bonds which optionally can be partially hydrated. It is also possible to modify the polymers of conjugated dienes by subsequent graft polymerization with styrene, vinyl toluene, alpha-methylstyrene, (meth)acrylic acid esters, acrylonitrile, etc., in order to obtain a particularly good electrical insulation of the coating compositions anodically deposited. The preparation of these diene polymers is known in the art.

Suitable alpha,beta-ethylenically unsaturated carboxylic acids for reaction with the diene polymers are (meth) acrylic acid, maleic acid, maleic anhydride, maleic acid semi-esters, fumaric acid, and itaconic acid. When using maleic acid semi-esters, the temperatures during the reaction with the diene polymer will cause a recyclizing to maleic anhydride with formation of the alcohol.

In preparing component A, the diene polymer and the unsaturated acid constituents, preferably maleic anhydride, are heated to 150–250° C. until the acid constituent has reacted completely. Thereafter, the formed adduct is reacted with the monohydric alcohol under reflux. In order to accelerate the reaction, catalysts such as the tertiary amines may be co-employed. The reaction temperature can be up to 50° C. above the boiling point of the alcohol used. The progress of the reaction can be followed by observing the acid value of the composition.

Suitable mono-alcohols for reaction with the diene polymer/acid adduct are the alkanols, e.g., methanol, ethanol, n-propanol, iso-propanol, n-butanol, iso-butanol, sec. butanol, etc., semi-esters of ethylene glycol, diethylene glycol, polyethylene glycols, propylene glycol, e.g., ethylene glycol monomethyl ether, ethylene glycol monoethyl ether, ethylene glycol monobutyl ether, diethylene glycol monoethyl ether, propylene glycol monobutyl ether, etc.

Preferred compounds for use as component B are resol carboxylic acids such as those obtained in known manner through condensation of formaldehyde with phenol carboxylic acids, such as 2 - (4 - hydroxyphenyl) - 2 - (carbethoxyphenyl) propane or 4,4-bis(4-hydroxyphenyl)-pentanoic acid or p-tertiary butyl phenol glycollic acid ether optionally after partial or complete etherification of the methylol groups. Condensation products of formaldehyde with phenols, e.g., p-tertiary butyl phenol, 2,2-bis(4 - hydroxyphenyl) - propane or with urea, thiourea, melamine, benzoguanamine, etc., optionally after etherification with low alcohols, can be co-employed if desired. When co-employing aminoplast components, the stoving temperatures can be reduced.

Suitable components C are compounds which have a sufficiently low volatility at the hardening temperatures of the coating so as to contribute to the formation of a hardened coating. Examples of such organic compounds are ethylene glycol, propylene glycol, butylene glycol, neopentyl glycol, glycerol, trimethylol propane, pentaerythritol, epoxy-free derivatives of ethers of diphenylolpropane with epichlorohydrine, e.g., their partial esters with fatty acids, etc. Furthermore, amine alcohols, e.g., triethanol amine, N,N,N',N'-tetrakis - (2 - hydroxypropyl) ethylenediamine and hydroxy group containing polymers, e.g., obtained by polymerization of allyl alcohol or (meth)acrylic acid monoethyleneglycol ester, optionally with other alpha,beta-ethylenically unsaturated monomers (such as styrene, vinyl toluene, (meth)acrylic acid esters, vinyl acetate, (meth)acrylamide, (meth)acrylnitrile), or by reaction of ethylene oxides with preformed carboxy groups containing polymers can be used. Products with special properties are obtained, if the polyhydroxy compounds are partially reacted with isocyanates such that the final product contains at least 2 hydroxy groups. The components of the composition may either be physically mixed or chemically combined through careful condensation which may be required particularly if the neutralized component B or component C has limited or no solubility in water.

Suitable bases for neutralizing the products of the invention are ammonia, primary, secondary, tertiary alkyl amines, e.g., (iso)propyl amine, butyl amine, amyl amine, diethyl amine, diisopropyl amine, dibutyl amine, morpholine, piperidine, trimethyl amine, triethyl amine, as well as the alkanol amines, e.g., diisopropanol amine, dimethylethanol amine, alkylene polyamines, e.g., ethylene diamine, diethylene triamine, triethylene tetramine, and the like. When using the coating compositions of the invention as binders for electrodeposition paints, alkali and/or alkaline earth hydroxides and the salts of acids having a dissociation constant lower than that of the resin can be used for neutralization as long as they form water-soluble soaps with the latter, optionally in the presence of water-tolerant solvents. Examples of suitable salts of such weakly dissociated acids are alkali carbonates, alkali carbamates, etc.

To further enhance the water solubility and for easier handling, the coating compositions of the invention can also contain water-miscible solvents. The greater the degree of water miscibility, the larger the amount of solvent which can be tolerated. The preferred solvents, therefore, are methanol, ethanol, (iso)-propanol, sec. butanol, ethylene glycol monomethyl ether, ethylene glycol monoethyl ether, ethylene glycol monoisopropylether, diacetone alcohol, dimethyl formamide, etc. Smaller amounts, i.e., up to 10 percent based on the weight of the binder, of partially water-miscible solvents may be co-employed. Such solvents are the higher alcohols such as n-butanol, (iso)-octanol, (iso)-tridecanol, higher glycol ethers such as glycollic acid-n-butylester, ethyleneglycol monobutylether, diethyleneglycol monobutylether, aliphatic, hydroaromatic or aromatic hydrocarbons such as various gas fractions, tetrahydronaphthlene, dekahydronaphthalene, benzene, toluene, xylene, ethylbenzene, etc., higher ketones such as trimethyl cyclohexanone, etc.

The water-soluble coating compositions of the invention can be applied by all common methods, pigmented or unpigmented. Particularly upon electrodeposition, the films obtained from the coating compositions of the invention show extremely improved corrosion resistance to salt spray and to an industrial atmosphere. A special advantage of the present product is the fact that the corrosion and salt spray resistance is equally good on metal substrates which have not undergone a pre-treatment. Thus, complicated phosphatizing and chromatizing procedures can be omitted in the mass production of metal objects. The coating compositions of the present invention show an improvement over the coating compositions of the parent application in their improved resistance to air oxidation when present in an electrodeposition bath which guarantees a uniform coating over long working periods.

The following preparations of components and examples illustrate the invention without limiting its scope. All parts are by weight unless otherwise stated.

COMPONENT A (1) 400 g. polybutadiene having a viscosity of 5 P/20° C., with about 80 percent cis and 20 percent trans-configuration and a molecular weight of about 1400, are heated to 200° C. with 1.5 g. copper naphthenate with 9 percent metal content, and 100 g. maleic anhydride. After 2½ hours of reaction time the free maleic anhydride content has fallen to zero. The acid number of the adduct is 190 mg. KOH/g. The batch is cooled to 100° C. and 50 g. diacetone alcohol and 35 g. methanol are slowly added under reflux. The temperature is held at 90–100° C. until the acid number has fallen to 90–95 mg. KOH/g.

(2) 500 g. polybutadiene with a viscosity of 9 P/45° C. and about 90 percent 1,2 vinyl and 10 percent 1,4 trans-configuration and molecular weight of about 1200, 0.1 g. diphenyl-p-phenylenediamine and 100 g. maleic anhydride are heated to 200° C. and held until the content of free maleic anhydride has fallen to zero. The batch is cooled to 140° C. The acid number is 160 mg. KOH/g. 90 g.

ethylene glycol monoethyl ether, mixed with 3 g. triethylamine, are added and the temperature held at 140° C. until the acid number has fallen to 65 mg. KOH/g.

(3) 400 g. polybutadiene with a viscosity of 5 P/20° C., 80 percent 1,4 cis and 20 percent 1,4 trans-configuration and a molecular weight of about 1400 are heated to 150° C. under a cover of inert gas. A solution of 0.6 g. ditertiary butylperoxide in 60 g. vinyltoluene is added continuously over a period of 2 hours. The temperature is held at 150° C. until a solid content of at least 95 percent is obtained.

The unreacted vinyl toluene is vacuum-stripped and the obtained graft polymer has a viscosity of 13 P/20° C. 400 g. of the material are heated to 200° C. together with 0.1 g. diphenyl-p-phenylene diamine and 100 g. maleic anhydride. After a reaction time of 3 hours the content of free maleic anhydride has fallen to zero. An adduct is obtained with an acid number of 190 mg. KOH/g. and a viscosity of P Gardner-Holdt, measured on a solution of 60 g. resin and 40 g. ethylene glycol monoethyl ether-acetate. After cooling to 140° C., a solution of 100 g. ethyleneglycol monoethylether and 3 g. N,N-dimethylbenzylamine is added to the batch. After reaction the acid value is 90 mg. KOH/g.

COMPONENT B (1) 360 g. of a 36 percent by weight aqueous formaldehyde solution 106 g. triethylamine and 286 g. 4,4-bis-(4-hydroxyphenyl)-pentanoic acid are heated to 80° C. and the pH-value of the batch is adjusted to 7.7–8.0 with more triethylamine. (The pH-value is measured on a 1:10 solution in distilled water.) The batch is held at 80° C. for 10 hours and then cooled.

(2) 228 g. 2,2-bis(4-hydroxyphenyl)-propane are dissolved in 500 ml. 2 N sodium hydroxide at elevated temperature and then a solution of 110 g. sodium monochloroacetate (technical) in 170 g. water is added. The temperature is slowly raised to 60–90° C. and held for 1 hour, with stirring of the reaction mass.

The batch is combined with 200 g. of a 35 percent by weight aqueous formaldehyde solution and the clear solution is held for 3 days at 40° C. Then the mixture of resol carboxylic acid and resol is precipitated with 100 g. butanol and the calculated amount of hydrochloric acid. After several washings, about 500 g. of a butanolic solution are obtained which has an acid number of about 140 mg. KOH/g. The solid content is about 65 percent. After neutralization with ammonia the solution is dilutable with water to any desired extent.

(3) By using an excess of sodium monochloroacetate over the theoretical amount, suitably preventing conditions which favor the undesired saponification of the chloroacetic acid or its sodium salt respectively, a substantially quantitative etherification of one phenolic hydroxy group is achieved, such that substantially the sodium salt of the diphenylol glycollic acid semi-ether is obtained. The ether is condensed with 175 g. formaldehyde as described in component B(2) and is further processed with 114 g. butanol or cyclohexanol. The condensate has an acid number of about 155 mg. KOH/g.

Instead of 2,2-bis-(4-hydroxyphenyl)-propane in components B(2) and B(3), other analogous bisphenols can be used which are obtained from higher ketones, such as methyl ethyl ketone, cyclohexanone, methylcyclohexanone, etc. Instead of an alkane radical, sulphur or sulphur dioxide may form the bridge in the bisphenol, or dioxy-diphenyl may serve as the bisphenol.

(4) To a mixture of 180 g. of a 36 percent by weight aqueous formaldehyde solution and 3 g. 40 percent by weight aqueous sodium hydroxide, 150 g. p-tertiary butyl phenol are added continuously over a period of an hour. In the course of 6 additional hours, 12 g. 40 percent by weight aqueous sodium hydroxide are added. After 48 hours at 40° C., a clear solution has formed with a content of free formaldehyde of about 2 percent. 50 g. sec. butanol and 100 g. 40 percent by weight aqueous sodium hydroxide are added and, at 50° C., as the exothermic reaction will allow, 120 g. sodium monochloroacetate are added. The batch is held at 80° C. for 5 hours. The formed resol carboxylic acid is liberated with 103 g. sulphuric acid, 50 percent by weight in water, and washed with water several times. The solid content is about 70 percent, the acid number about 140 mg. KOH/g.

The following examples illustrate the invention without limiting the scope of it:

Example 1

585 g. of component A(1), 200 g. ethylene glycol monoethylether and 60 g. of a co-polymer of allyl alcohol and styrene with a hydroxy equivalent of 300 and a molecular weight of 1600 are heated to 110° C. and stirred. The temperature is held until a sample of the reaction mixture is clearly soluble in water upon neutralization with ammonia. The batch is cooled to 60° C. and 200 g. of component B(1) are added. The acid value is 90–100 mg. KOH/g. At room temperature, 70 ml. concentrated ammonia is added. The neutralized resin has a solid content of about 70 percent.

290 g. of the neutralized binder is ground on a triple roll mill together with 20 g. $TiO_2$, Rutile type, 20 g. red iron oxide, and 20 g. aluminum silicate. The mill paste is diluted with 1600 g. de-ionized water and the pH-value is adjusted to 7.5 with more ammonia.

A paint bath was formed in a metal container having a 2.5 liter volume which was wired as a cathode. Within 1 minute, upon application of a direct current of 100 volts on a 200 cm.$^2$ anode of phosphated steel plate, a dense film is deposited which can be rinsed well. After curing 30 minutes at 180° C., a smooth coating of 28μ thickness has formed. After 240 hours of salt spray, ASTM–B 117–61 the cross-incision will show a corrosion of 3 mm.

The paint bath is stirred for 200 hours at 40° C. and then cooled to 25° C. The described deposition of a film is repeated and yields an equally good coating with equal corrosion resistance, demonstrating the superior stability of the bath.

Example 2

690 g. of component A(2), 200 g. ethylene glycol monobutylether, and 100 g. diethoxy diphenylolpropane are heated to and held at 100° C. until a sample can be neutralized with triethylamine in water. 100 g. component B(2) are added and the batch is diluted with ethylene glycol monobutylether to a solid content of 70 percent.

The resin is diluted with triethylamine and water to a 25 percent solution with a pH-value of 7.8. This solution is applied at high speed to steel coils by rollers. The film is cured at 200° C. for 10 seconds to a highly flexible and scratch resistant coating of 5μ with good corrosion resistance.

Example 3

600 g. of component A(3) are mixed with 200 g. of component B(3) at 60° C., then 60 g. isophoron are added and the reaction mixture is diluted to 70 percent solids with isopropanol. To the resin solution sufficient 40 percent aqueous potassium hydroxide is added to provide an aqueous solution with 10 percent resin solids having a pH-value of 7.5.

330 g. of the neutralized solution of the binder are ground on a triple roll mill with 32 g. $TiO_2$ (Rutile type), 32 g. aluminum silicate and 2 g. carbon black. Upon addition of 1600 g. water a paint solution is obtained which is further processed as described in Example 1.

The obtained coatings have a film thickness of 25μ. After 240 hours of salt spray, ASTM–B 117–61, the cross-incision shows a corrosion of 2 mm.

After 200 hours of stirring at 40° C., the films deposited from this solution are excellent and provide unchanged protection against corrosion.

For testing the throwing power, a plastic cylinder 6 cm. in diameter and 1 litre in volume having a disc cathode of 6 cm. diameter at its base is filled with the paint solution. A steel strip 5 cm. wide, wired as anode is immerged into the testing material. The base end of the strip is placed at a distance of 2 cm. from the cathode. After 1 minute of deposition at 200 volts, rinsing with de-ionized water and curing for 30 minutes at 180° C., a film thickness of 26µ is measured at the bottom of the strip and a film thickness of 15µ at the top (surface of paint bath). In comparison with Example 3 of the parent patent, an upper film thickness of only 4µ is obtained.

Example 4

585 g. of component A(1) are mixed thoroughly with 65 g. of component B(4) and 240 g. ethylene glycol monoethylether at room temperature. The obtained resin solution has a solid content 65 percent. Upon neutralization with ammonia to a pH-value of about 7.0 (measured on a 10 percent aqueous solution in distilled water), the resin is pigmented analogous to Example 1, diluted and deposited anodically. The test of the throwing power according to Example 3 yields a film thickness of 20µ at the bottom of the test strip and a film thickness of 14µ at the top.

The coated phosphated steel strip with a coating of 28µ shows a corrosion of 2 mm. at the cross-incision after 240 hours of salt spray ASTM-B 117–61.

In the aforesaid examples, the percentage of carboxyl groups on the diene polymer/unsaturated acid reaction product esterified with the monohydric compound can be varied over a substantial range to obtain the superior reduction in auto-oxidation of the final composition. It has been found, however, that above about 70 percent esterification of the carboxyl groups leads to inferior neutralization and water-solubility characteristics. Below about 5 percent esterification of the carboxyl groups, the reduction of auto-oxidation is not appreciable over composition without pre-esterification. Preferably, the compound will have from about 35—60 percent of the carboxyl groups esterified. Additionally, the proportions of component A to component B can be varied over a substantial range. As indicated hereinbefore, by employing the partial esters of the diene polymer/ethylenically saturated carboxylic acid, the percentage of component B can be reduced to obtain equivalent results. It has been found that the percentage of component B can vary from about 5 to 50 percent. Preferably, component B will be present at from about 8 to 30 percent calculated on the solid substance of components A and B. The preferred diene polymers are the butadiene-1,3, 2-methylbutadiene-1,3, and 2,3-dimethylbutadiene-1,3; and co-polymers of at least 70 percent of such butadienes with other co-polymerizable monomers of the vinyl type. The diene polymers preferably have from about 40 to 85 percent cis-configuration. The alpha, beta-ethylenically unsaturated carboxylic acid is preferably maleic acid or its anhydride.

One skilled in the art will appreciate that various other modifications can be made within the framework and scope of the present invention. These modifications being within the ability of one skilled in the art are embraced by the appended claims.

It is claimed:

1. A coating composition characterized in that it is water soluble upon neutralization comprising:
   (A) a partial ester of the reaction product of
   (a) a diene polymer having a molecular weight of from about 200–20,000 and being a member of the group consisting of butadiene-1,3; 2-methylbutadiene-1,3; 2,3-dimethylbutadiene-1,3; and chloroprene; and
   (b) an alpha,beta-ethylenically unsaturated carboxylic acid or its anhydride, semi-ester, semi-amide or mixtures thereof, the proportion of (a) and (b) being controlled to provide a reaction product carrying carboxyl groups, with a monohydric lower alkanol or a semi-ether of a lower alkylene glycol, said reaction product having from about 5 to 70 percent of its carboxyl groups esterified with said alkanol or semi-ether; and
   (B) from about 5–50 percent of (A), calculated as solid substances, of a heat-reactive condensation product of formaldehyde with phenol carboxylic acids.

2. The composition of claim 1 wherein the butadiene polymer contains from about 40 to 85 percent cis-configuration.

3. The composition of claim 1 wherein the alpha,beta-ethylenically unsaturated acid is a dicarboxylic acid.

4. The composition of claim 3 wherein the dicarboxylic acid is maleic acid.

5. The composition of claim 1 wherein from about 35 to 60 percent of the carboxyl groups are esterified.

6. The composition of claim 1 wherein the methylol groups of component B are etherified with low molecular weight alcohols.

7. The composition of claim 1 wherein component B includes condensation products of formaldehyde and para-position hydrocarbon substituted phenols.

8. The composition of claim 1 including as component C a polyhydroxyl component with at least 2 hydroxyl groups and a molecular weight of from about 50 to 3,000.

9. The composition of claim 1 including as component D etherified and/or unetherified condensation products of formaldeheyde with urea and/or aminotriazines.

10. The composition of claim 1 including water-tolerant solvents.

11. The process of electrodepositiing the coating composition of claim 1 upon a support.

References Cited

UNITED STATES PATENTS

| 3,658,795 | 4/1972 | Daimer | 260—839 |
| 2,981,710 | 4/1961 | Hoenel | 260—29.3 |
| 3,230,162 | 1/1966 | Gilchrist | 260—29.3 |
| 3,298,985 | 1/1967 | Bills et al. | 260—845 |
| 3,340,172 | 9/1967 | Huggard | 260—29.3 |
| 3,351,675 | 11/1967 | Gilchrist | 260—845 |
| 3,410,818 | 11/1968 | Yurlick et al. | 260—845 |

JOHN C. BLEUTGE, Primary Examiner

U.S. Cl. X.R.

204—181; 260—29.3, 29.4 R, 32.8 R, 32.8 N, 33.2 R, 33.4 R, 840, 845, 846